(12) United States Patent
Fellenstein et al.

(10) Patent No.: US 7,571,120 B2
(45) Date of Patent: Aug. 4, 2009

(54) COMPUTER IMPLEMENTED METHOD FOR ESTIMATING FUTURE GRID JOB COSTS BY CLASSIFYING GRID JOBS AND STORING RESULTS OF PROCESSING GRID JOB MICROCOSMS

(75) Inventors: Craig William Fellenstein, Brookfield, CT (US); Rick Allen Hamilton, II, Charlottesville, VA (US); Joshy Joseph, Poughkeepsie, NY (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 935 days.

(21) Appl. No.: 11/034,305

(22) Filed: Jan. 12, 2005

(65) Prior Publication Data
US 2006/0167984 A1    Jul. 27, 2006

(51) Int. Cl.
G06Q 30/00    (2006.01)
G06F 17/30    (2006.01)

(52) U.S. Cl. .................... 705/26; 705/1; 705/27
(58) Field of Classification Search ............ 705/1, 705/26–27, 37
See application file for complete search history.

(56) References Cited

U.S. PATENT DOCUMENTS

| | | | |
|---|---|---|---|
| 4,591,980 A | 5/1986 | Huberman et al. | 712/16 |
| 5,325,525 A | 6/1994 | Shan et al. | 718/104 |
| 5,392,430 A * | 2/1995 | Chen et al. | 718/102 |
| 5,630,156 A | 5/1997 | Privat et al. | 712/14 |

(Continued)

FOREIGN PATENT DOCUMENTS

EP        0790559 A      8/1997

(Continued)

OTHER PUBLICATIONS

"SGI and Platform Computing Announce Global for Grid Computing Solutions". PR Newswire. New York: Jul. 16, 2002. p. 1 [recovered from Proquest on Dec. 9, 2008].*

(Continued)

*Primary Examiner*—Jeffrey A. Smith
*Assistant Examiner*—William J. Allen
(74) *Attorney, Agent, or Firm*—William H. Steinberg; Amy J. Pattillo (57) ABSTRACT

A client side agent estimates future grid job costs by comparing a current grid job of a particular classification with a history of stored costs for other grid jobs of that customer of that particular classification. The grid client agent for a client system enabled to submit grid jobs to a grid provider that facilitates a grid environment, calculates a ratio of an application based metric to a grid provider metric for processing a particular grid job. The grid client agent creates a table with an entry comparing the application based metric to a cost per grid provider metric for the grid provider based on the calculated ratio. The grid client agent stores the table with the entry. Responsive to detecting a next grid job, the grid client agent estimates a cost for the grid provider to process the next grid job based on a particular number of application based metric operations required for the next grid job, translated by the ratio into the grid provider metric and multiplied by the cost per grid provider metric.

6 Claims, 6 Drawing Sheets

U.S. PATENT DOCUMENTS

| | | | | |
|---|---|---|---|---|
| 5,729,472 | A | | 3/1998 | Seiffert et al. |
| 5,905,975 | A | * | 5/1999 | Ausubel ................... 705/37 |
| 5,931,911 | A | | 8/1999 | Remy et al. ................. 709/223 |
| 5,978,583 | A | | 11/1999 | Ekanadham et al. ........ 717/106 |
| 5,996,013 | A | * | 11/1999 | Delp et al. .................. 709/226 |
| 6,067,580 | A | | 5/2000 | Aman et al. .................. 719/33 |
| 6,397,197 | B1 | | 5/2002 | Gindlesperger ............. 705/37 |
| 6,438,704 | B1 | | 8/2002 | Harris et al. ................ 713/502 |
| 6,453,376 | B1 | | 9/2002 | Fairman et al. ............ 710/240 |
| 6,647,373 | B1 | * | 11/2003 | Carlton-Foss ................ 705/37 |
| 6,671,676 | B1 | | 12/2003 | Shacham ..................... 705/37 |
| 6,681,251 | B1 | | 1/2004 | Leymann et al. ............ 709/226 |
| 6,738,736 | B1 | * | 5/2004 | Bond ............................. 703/2 |
| 6,748,416 | B2 | | 6/2004 | Carpenter et al. ........... 709/202 |
| 2002/0057684 | A1 | | 5/2002 | Miyamoto et al. .......... 370/386 |
| 2002/0165979 | A1 | | 11/2002 | Vincent ...................... 709/239 |
| 2003/0023499 | A1 | * | 1/2003 | Das et al. ...................... 705/26 |
| 2003/0036886 | A1 | | 2/2003 | Stone |
| 2003/0112809 | A1 | | 6/2003 | Bharali et al. ............... 370/400 |
| 2003/0115099 | A1 | | 6/2003 | Burns et al. .................... 705/14 |
| 2003/0145084 | A1 | | 7/2003 | McNerney .................. 709/224 |
| 2003/0204485 | A1 | | 10/2003 | Triggs ........................... 707/1 |
| 2004/0078471 | A1 | | 4/2004 | Yang .......................... 709/227 |
| 2004/0193461 | A1 | * | 9/2004 | Keohane et al. ................ 705/7 |
| 2007/0022425 | A1 | | 1/2007 | Jackson | |

FOREIGN PATENT DOCUMENTS

| | | |
|---|---|---|
| EP | 1267552 A | 12/2002 |
| WO | WO 03/067494 A1 | 8/2003 |

OTHER PUBLICATIONS

Foster et al.; The Anatomy of the Grid, Enabling Scalable Virtual Organizations; available at www.globus.org/research/papers/anatomy.pdf as of Nov. 27, 2003.

Foster et al.; The Physiology of the Grid, An Open Grid Services Architecture for Distributed Systems Integration; available at www.globus/org/research/papers/ogsa.pdf as of Nov. 27, 2003.

Foster, Ian; What is the Grid! A Three Point Checklist; available at www-fp.mcs.anl.gov/~foster/Articles/WhatIsTheGrid.pdf as of Nov. 27, 2003.

Ferreira et al.; IBM Redpaper—Globus Toolkit 3.0 Quick Start; available at www.redbooks.ibm.com/redpapers/pdfs/redp369 as of Nov. 27, 2003.

IBM Grid Computing—What is Grid Computing; available at www-1.ibm.com/grid/about_grid/what_is.shtml as of Nov. 27, 2003.

Berstis, Viktors; IBM Redpaper—Fundamentals of Grid Computing; available at www.redbooks.ibm.com/redpapers/pdfs/redp3613.pdf as of Nov. 27, 2003.

Jacob, Bart; IBM Grid Computing—Grid Computing: What are the key components!; available at www-106.ibm.com/developerworks/grid/library/gr-overview/ as of Nov. 27, 2003.

Unger et al.; IBM Grid Computing—A Visual Tour of Open Grid Services Architecture; available at www-106.ibm.com/developerworks/grid/library/gr-visual/ as of Nov. 27, 2003.

Edited by Rajkumar Buyya; Grid Computing Info Centre: Frequently Asked Questions (FAQ); available at http://www.cs.mu.oz.au/~raj/GrindInfoware/gridfaq.html as of Nov. 27, 2003.

U.S. Appl. No. 11/034,335, filed Jan. 12, 2005, Fellenstein et al.

U.S. Appl. No. 11/034,303, filed Jan. 12, 2005, Fellenstein et al.

Massie ML et al, "The Ganglia Distributed Monitoring System: Design, Implementation, and Experience" Parallel Computing Elsevier Netherlands, vol. 30, No. 7, Jul. 2004, pp. 817-840.

Fenglian Xu et al, "Tools and Support for Deploying Applications on the Grid" Services Computing, 2004. Proceedings 2004 International Conference on Shanghai, China, Sep. 15-18, 2004, Piscataway, NJ, IEEE, pp. 281-287.

Ian Foster and Carl Kesselman, "Grid2—Blueprint for a New Computing Infrastructure" 2004, Elsevier, San Francisco, CA, chapter 20, Instrumentation and Monitoring, pp. 319-343.

Smallen S et al, "The Inca Test Harness and Reporting Framework" Supercomputing 2004. Proceedings of the ACM/ IEEE SC2004 Conference Pittsburgh, PA, Nov. 2004, p. 1-10.

Allen G, et al, "The Cactus Worm: Experiments with Dynamic Resource Discovery and Allocation in a Grid Environment", International Journal of High Performance Computing Applications, Sage Science Press, Thousand Oaks, US, vol. 15, No. 4, 2001, pp. 345-358.

Hwa Min Lee, "A Fault Tolerance Service for QoS in Grid Computing", Lecture Notes in Computer Science, vol. 2659, Aug. 2003, pp. 286-296.

Tianyi Zang, et al, "The Design and Implemenation of an OGSA-based grid information service" Web Services, 2004. Proceedings IEEE International Conference on San Diego CA, Piscataway, NJ, IEEE, Jul. 6, 2004, pp. 566-573.

Sample N, et al, "Scheduling Under Uncertainty: Planning for the Ubiquitous Grid", Coordination Models and Languages, 5th International Conference, Coordination 2002. Proceedings (Lecture Notes in Compter Science, vol. 2315) Springer-Varlag Berlin, Germany, 2002, pp. 300-316.

Gever DH, et al, "WWW-based high performance computing support of acoustic matched field processing", MTS/ IEEE Oceans 2001. An Ocean Odessey. Conference Proceedings (IEEE Cat. No. 01CH37295) Marine Technology Soc. Washington, DC, vol. 4, 2001, p. 2541-2548.

Chase, JS et al, "Dynamic Virtual Clusters in a Grid Site Manager",High Performance Distributed Computing 2003. Proceedings. 12th IEEE International Symposium, Jun. 22-24, 2003, Piscataway, NJ, USA, IEEE, pp. 90-100.

"Method of Providing On-Demand-Computing for Server Blades", IP.com Journal, IP.com Inc., West Henrietta, NY, US, Sep. 8, 2003, page 1.

Kubicek, C, et al., "Dynamic Allocation of Servers to Jobs in a Grid Hosting Environment", By Technology Journal, vol. 22, No. 3, Jul. 2004, pp. 251-260.

Yang, Kun, et al, "Network Engineering Towards Efficient Resource On-Demand in Grid Computing", Communication Technology Proceedings, 2003, ICCT 2003, International Conference on Apr. 9-11, 2003, Piscataway, NJ, USA, IEEE, vol. 2, Apr. 9, 2003, pp. 1715-1718.

* cited by examiner

COSTS TABLE 710

| APPLICATION METRIC 804 | PROVIDER 806 | GRID PROVIDER METRIC 808 | TRANSLATION VALUE (RATIO) 810 | OFFERED PRICE PER GRID METRIC 812 |
|---|---|---|---|---|
| "PER MERGE" | ACME GRID | HOURLY CHARGE | 3,000,000 MERGES PER HOUR | $40 PER HOUR |
|  | WILEY GRID | COMPOSITE CHARGE | 600 MERGES PER COMPOSITE UNIT | $0.02 PER COMPOSITE UNIT |
|  | COYOTE GRID | MFP OPERATION CHARGE | 2000 MERGES PER MFP OPERATION | $0.08 PER MFP OPERATION |
| "PER MODEL ITERATION" | ACME GRID | HOURLY CHARGE | 20,000 ITERATIONS PER HOUR | $40 PER HOUR |
|  | WILEY GRID | COMPOSITE CHARGE | 80 ITERATIONS PER COMPOSITE UNIT | $0.02 PER COMPOSITE UNIT |
|  | COYOTE GRID | MFP OPERATION CHARGE | 6 ITERATIONS PER MFP OPERATION | $0.08 PER MFP OPERATION |

COMPUTER IMPLEMENTED METHOD FOR ESTIMATING FUTURE GRID JOB COSTS BY CLASSIFYING GRID JOBS AND STORING RESULTS OF PROCESSING GRID JOB MICROCOSMS

CROSS-REFERENCE TO RELATED APPLICATIONS

The present application is related to the following co-pending applications, hereby incorporated herein by reference:
(1) U.S. patent application Ser. No. 11/034,303, filed Jan. 12, 2005; and
(2) U.S. patent application Ser. No. 11/034,335, filed Jan. 12, 2005.

BACKGROUND OF THE INVENTION

1. Technical Field

The present invention relates in general to improved grid computing and in particular to efficient client-side estimation of future grid job costs. Still more particularly, the present invention relates to customer estimation of future grid job costs by comparing a current grid job of a particular classification with a history of stored costs for other grid jobs of that customer of that particular classification.

2. Description of the Related Art

Ever since the first connection was made between two computer systems, new ways of transferring data, resources, and other information between two computer systems via a connection continue to develop. In typical network architectures, when two computer systems are exchanging data via a connection, one of the computer systems is considered a client sending requests and the other is considered a server processing the requests and returning results. In an effort to increase the speed at which requests are handled, server systems continue to expand in size and speed. Further, in an effort to handle peak periods when multiple requests are arriving every second, server systems are often joined together as a group and requests are distributed among the grouped servers. Multiple methods of grouping servers have developed such as clustering, multi-system shared data (sysplex) environments, and enterprise systems. With a cluster of servers, one server is typically designated to manage distribution of incoming requests and outgoing responses. The other servers typically operate in parallel to handle the distributed requests from clients. Thus, one of multiple servers in a cluster may service a client request without the client detecting that a cluster of servers is processing the request.

Typically, servers or groups of servers operate on a particular network platform, such as Unix or some variation of Unix, and provide a hosting environment for running applications. Each network platform may provide functions ranging from database integration, clustering services, and security to workload management and problem determination. Each network platform typically offers different implementations, semantic behaviors, and application programming interfaces (APIs).

Merely grouping servers together to expand processing power, however, is a limited method of improving efficiency of response times in a network. Thus, increasingly, within a company network, rather than just grouping servers, servers and groups of server systems are organized as distributed resources. There is an increased effort to collaborate, share data, share cycles, and improve other modes of interaction among servers within a company network and outside the company network. Further, there is an increased effort to outsource nonessential elements from one company network to that of a service provider network. Moreover, there is a movement to coordinate resource sharing between resources that are not subject to the same management system, but still address issues of security, policy, payment, and membership. For example, resources on an individual's desktop are not typically subject to the same management system as resources of a company server cluster. Even different administrative groups within a company network may implement distinct management systems.

The problems with decentralizing the resources available from servers and other computing systems operating on different network platforms, located in different regions, with different security protocols and each controlled by a different management system, has led to the development of Grid technologies using open standards for operating a grid environment. Grid environments support the sharing and coordinated use of diverse resources in dynamic, distributed, virtual organizations. A virtual organization is created within a grid environment when a selection of resources, from geographically distributed systems operated by different organizations with differing policies and management systems, is organized to handle a job request. A grid vendor may develop a grid environment to which a buyer may submit grid jobs, for example.

Grid vendors may offer to process grid jobs with different performance promises and with different pricing policies. Even if standards, such as those proposed by the open standards organization for Grid technologies, define standard monitoring, metering, rating, accounting, and billing interfaces, grid vendors will still have different physical resources available to process grid jobs, and thus pricing and performance will still vary among grid vendors. In one example, grid vendors have to measure the use of the grid vendor's resources by a grid job, which may involve complex formulas which take into account multiple factors, in addition to the actual use of resources. For example, a grid vendor may dedicate a particular processor resource to a particular job and charge the grid job for the dedicated use of the processor, in addition to the actual number of processor cycles the grid job required.

While grid vendors are focused on monitoring, metering, accounting a billing for the actual usage of physical resources, at a computational cycle level, grid clients or customers are focused on processing of applications and jobs at an application type level. As a result, there is a lack of connection between the way that grid customers and grid vendors view the costs associated with grid jobs. Further, currently, each grid vendor still monitors, meters, and bills for grid jobs using different units of physical resource measurement. Thus, because of the disconnect between the client grid job at an application level and the grid vendor measurement of use of physical resources, it is difficult for grid clients to compare the costs of processing grid jobs at different grid vendors and to estimate future costs of submitting grid jobs to a same grid vendor.

Therefore, in view of the foregoing, it would have advantageous to provide a method, system, and program for estimating future job costs by classifying grid jobs in categories with client-defined application based metric units, converting the grid vendor defined metric costs to perform grid jobs into the client-defined application based metric unit costs by category of grid job, and storing the converted client-defined application based metric unit costs for predicting future costs of grid jobs of the same category. In particular, it would be advantageous to submit grid job microcosms, or smaller representative grid jobs, to multiple grid vendors to retrieve actual costs for each category of grid job on a smaller basis, converting the grid vendor defined metric costs to a client-defined application based metric unit cost, and comparing the costs at the client-defined application based metric level, before submitting larger grid jobs, in the future to the most cost effective grid vendor.

SUMMARY OF THE INVENTION

In view of the foregoing, the invention in general provides for grid computing client-side estimation of future grid job costs. The invention relates to customer estimation of future grid job costs by comparing a current grid job of a particular classification with a history of stored costs for other grid jobs of that customer of that particular classification.

A grid client agent for a client system enabled to submit grid jobs to a grid provider that facilitates an on-demand grid environment, calculates a ratio of an application based metric to a grid provider metric for processing a particular grid job. Then, the grid client agent creates a table with an entry comparing the application based metric to a cost per grid provider metric for the grid provider based on the calculated ratio. Next, the grid client agent stores the table with the entry. Then, responsive to detecting a next grid job, the grid client agent estimates a cost for the grid provider to process the next grid job based on a particular number of application based metric operations required for the next grid job, translated by the ratio into the grid provider metric and multiplied by the cost per grid provider metric.

To calculate the ratio, the grid client agent distributes a job microcosm, which is a smaller representation of a particular grid job, to the grid provider for processing in the on-demand grid environment. Responsive to receiving the result of the job microcosm and a charge for processing the job microcosm based on a grid provider metric for the grid provider, grid client agent calculates the ratio of the application based metric to the grid provider metric and identifies the cost per grid provider metric from the charge for processing the job microcosm.

When the grid client agent detects an adjusted cost per grid provider metric, whether through a pricing notification or the charges for another grid job, the grid client agent updates the entry for the grid provider with the adjusted cost per grid provider metric and automatically reestimates the cost for the grid provider to process the next grid job based on the adjusted cost per grid provider metric, without requiring a new calculation of the ratio.

The table includes additional entries from additional grid providers who process grid microcosms of a particular job, where the grid client agent calculates a ratio of the application based metric to each grid providers different metric for each entry in the table. Where multiple grid provider entries are available in the table, then the grid client agent estimates the cost for each grid provider to process the next grid job based on the ratio and cost per grid provider metric in each entry and compares the costs which are calculated for the application based metric number of operation required for the next grid job.

In addition, entries in the table are classified by category of grid job. Thus, the grid client agent will detect the next grid job, classify the grid job within one of the categories of grid job, and access those entries in the table that are also classified by the same category of grid job.

BRIEF DESCRIPTION OF THE DRAWINGS

The novel features believed aspect of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
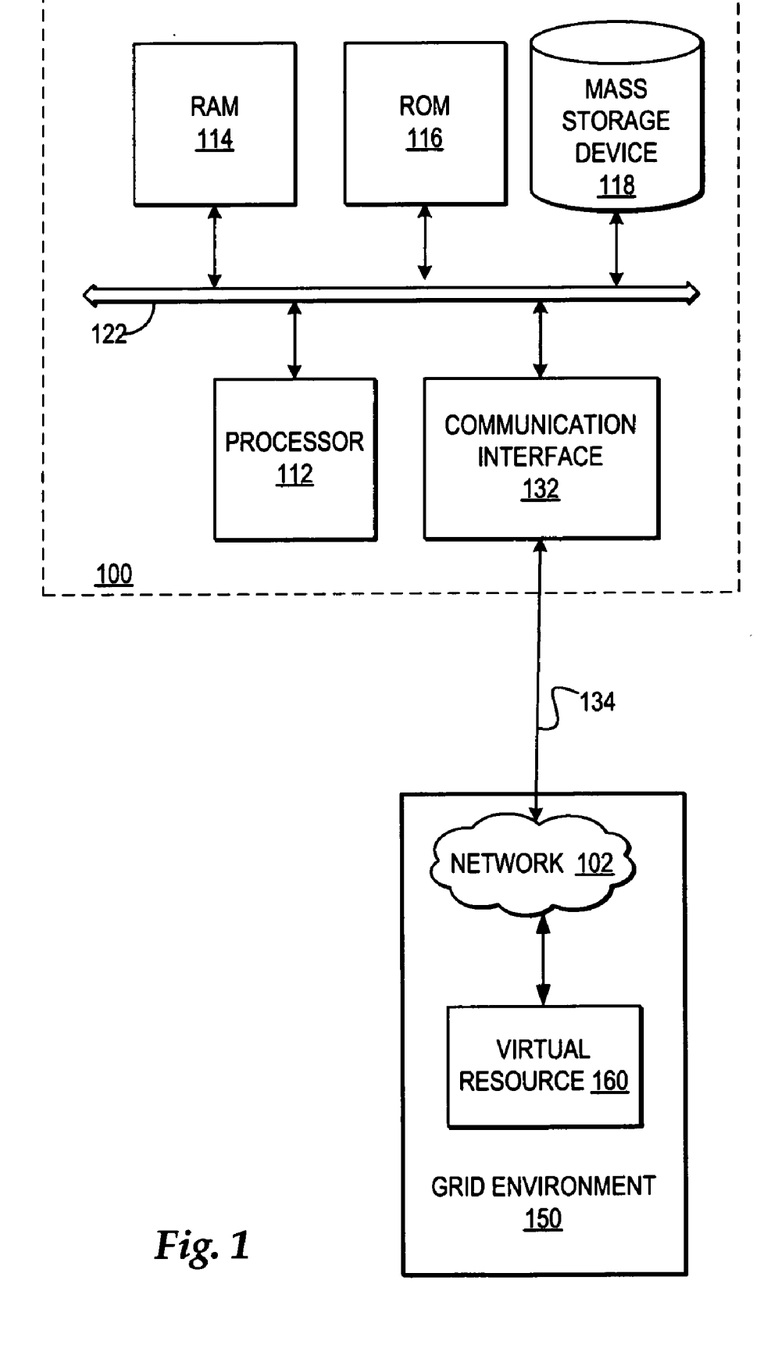
FIG. 1 depicts one embodiment of a computer system which may be implemented in a grid environment and in which the present invention may be implemented.

Referring now to the drawings and in particular to FIG. 1, there is depicted one embodiment of a computer system which may be implemented in a grid environment and in which the present invention may be implemented. As will be further described, the grid environment includes multiple computer systems managed to provide resources. Additionally, as will be further described, the present invention may be executed in a variety of computer systems, including a variety of computing systems, mobile systems, and electronic devices operating under a number of different operating systems managed within a grid environment.

In one embodiment, computer system 100 includes a bus 122 or other device for communicating information within computer system 100, and at least one processing device such as processor 112, coupled to bus 122 for processing information. Bus 122 may include low-latency and higher latency paths connected by bridges and adapters and controlled within computer system 100 by multiple bus controllers. When implemented as a server system, computer system 100 typically includes multiple processors designed to improve network servicing power.

Processor 112 may be a general-purpose processor such as IBM's PowerPC (PowerPC is a registered trademark of International Business Machines Corporation) processor that, during normal operation, processes data under the control of operating system and application software accessible from a dynamic storage device such as random access memory (RAM) 114 and a static storage device such as Read Only Memory (ROM) 116. The operating system may provide a graphical user interface (GUI) to the user. In one embodiment, application software contains machine executable instructions that when executed on processor 112 carry out the operations depicted in the flowchart of FIG. 9 and others operations described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein includes any medium that participates in providing instructions to processor 112 or other components of computer system 100 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM 114. Transmission media include coaxial cables, copper wire or fiber optics, including the wires that comprise bus 122. Transmission media can also take the form of acoustic or light waves, such as those generated during radio frequency or infrared data communications.

Moreover, the present invention may be downloaded as a computer program product, wherein the program instructions may be transferred from a remote virtual resource, such as a virtual resource 160, to requesting computer system 100 by way of data signals embodied in a carrier wave or other propagation medium via a network link 134 (e.g. a modem or network connection) to a communications interface 132 coupled to bus 122. Virtual resource 160 may include a virtual representation of the resources accessible from a single system or systems, wherein multiple systems may each be considered discrete sets of resources operating on independent platforms, but coordinated as a virtual resource by a grid manager. Communications interface 132 provides a two-way data communications coupling to network link 134 that may be connected, for example, to a local area network (LAN), wide area network (WAN), or an Internet Service Provider (ISP) that provide access to network 102. In particular, network link 134 may provide wired and/or wireless network communications to one or more networks, such as network 102, through which use of virtual resources, such as virtual resource 160, is accessible as provided within a grid environment 150. Grid environment 150 may be part of multiple types of networks, including a peer-to-peer network, or may be part of a single computer system, such as computer system 100.

As one example, network 102 may refer to the worldwide collection of networks and gateways that use a particular protocol, such as Transmission Control Protocol (TCP) and Internet Protocol (IP), to communicate with one another. Network 102 uses electrical, electromagnetic, or optical signals that carry digital data streams. The signals through the various networks and the signals on network link 134 and through communication interface 132, which carry the digital data to and from computer system 100, are exemplary forms of carrier waves transporting the information. It will be understood that alternate types of networks, combinations of networks, and infrastructures of networks may be implemented.

When implemented as a server system, computer system 100 typically includes multiple communication interfaces accessible via multiple peripheral component interconnect (PCI) bus bridges connected to an input/output controller. In this manner, computer system 100 allows connections to multiple network computers.

Additionally, although not depicted, multiple peripheral components and internal/external devices may be added to computer system 100, connected to multiple controllers, adapters, and expansion slots coupled to one of the multiple levels of bus 122. For example, a display device, audio device, keyboard, or cursor control device may be added as a peripheral component.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
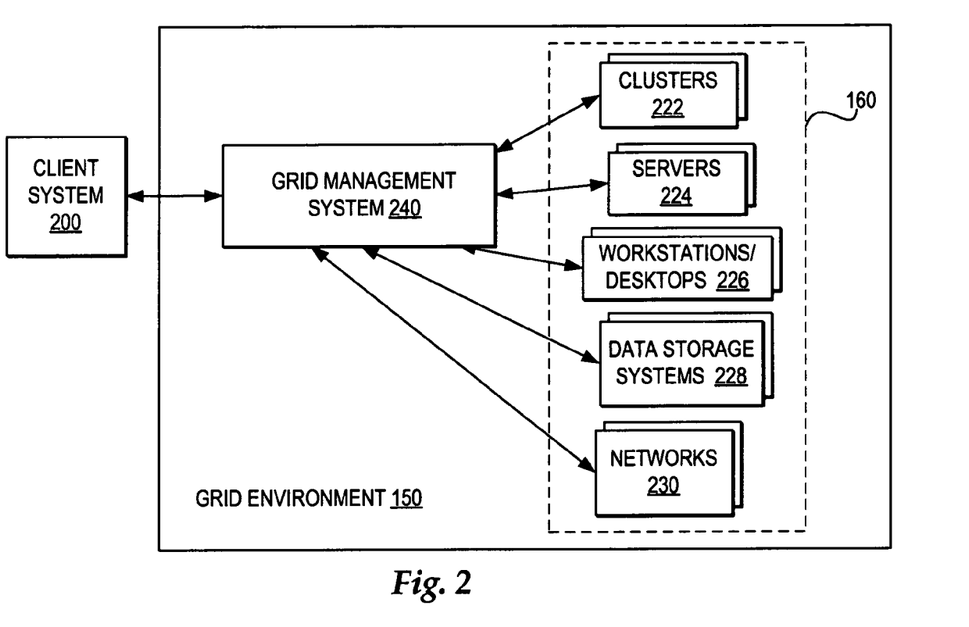
FIG. 2 is block diagram illustrating one embodiment of the general types of components within a grid environment.

With reference now to FIG. 2, a block diagram illustrates one embodiment of the general types of components within a grid environment. In the present example, the components of a grid environment 150 include a client system 200 interfacing with a grid management system 240 which interfaces with server clusters 222, servers 224, workstations and desktops 226, data storage systems 228, and networks 230. For purposes of illustration, the network locations and types of networks connecting the components within grid environment 150 are not depicted. It will be understood, however, that the components within grid environment 150 may reside atop a network infrastructure architecture that may be implemented with multiple types of networks overlapping one another. Network infrastructure may range from multiple large enterprise systems to a peer-to-peer system to a single computer system. Further, it will be understood that the components within grid environment 150 are merely representations of the types of components within a grid environment. A grid environment may simply be encompassed in a single computer system or may encompass multiple enterprises of systems.

It will be understood that grid environment 150 may be provided by a grid vendor or provider, where a cost for use of resources within grid environment 150 may be calculated based on the amount of time required for a grid job to execute or the actual amount of resources used, for example. In addition, it will be understood that grid environment 150 may include grid resources supplied by a single grid vendor, such as a particular business enterprise, or multiple vendors, where each vendor continues to monitor and manage the vendor's group of resources, but grid management system 240 is able to monitor unintended changes across all the resources, regardless of which vendors provide which resources. Further, it will be understood that although resource discovery mechanisms for discovering available grid resources are not depicted, client system 200 or grid management system 240 may discover grid resources advertised from local and global directories available within and outside of grid environment 150.

The central goal of a grid environment, such as grid environment 150 is organization and delivery of resources from multiple discrete systems viewed as virtual resource 160. Client system 200, server clusters 222, servers 224, workstations and desktops 226, data storage systems 228, networks 230 and the systems creating grid management system 240 may be heterogeneous and regionally distributed with independent management systems, but enabled to exchange information, resources, and services through a grid infrastructure enabled by grid management system 240. Further, server clusters 222, servers 224, workstations and desktops 226, data storage systems 228, and networks 230 may be geographically distributed across countries and continents or locally accessible to one another.

In the example, client system 200 interfaces with grid management system 240. Client system 200 may represent any computing system sending requests to grid management system 240. In particular, client system 200 may send virtual job requests (or requests for a quote (RFQs) and jobs to grid management system 240. Further, while in the present embodiment client system 200 is depicted as accessing grid environment 150 with a request, in alternate embodiments client system 200 may also operate within grid environment 150.

While the systems within virtual resource 160 are depicted in parallel, in reality, the systems may be part of a hierarchy of systems where some systems within virtual resource 160 may be local to client system 200, while other systems require access to external networks. Additionally, it is important to note, that systems depicted within virtual resources 160 may be physically encompassed within client system 200.

To implement grid environment 150, grid management system 240 facilitates grid services. Grid services may be designed according to multiple architectures, including, but not limited to, the Open Grid Services Architecture (OGSA). In particular, grid management system 240 refers to the management environment which creates a grid by linking computing systems into a heterogeneous network environment characterized by sharing of resources through grid services.

In particular, as will be described with reference to FIGS. 4-6, grid management system 240 may include grid services that enable automated responses to bid requests and automated monitoring and metering of grid jobs. In addition, grid management system 240 may include additional services for automating functions performed within grid environment 150.

According to an advantage of the invention, client system 200 includes a grid client agent for estimating future costs of grid jobs. As will be described with reference to FIG. 7, the grid client agent estimates future costs of grid jobs by classifying grid jobs into categories, storing previously charged costs for each category of grid job in a table, and accessing the table to predict future costs of grid jobs by category.

Figure 3:
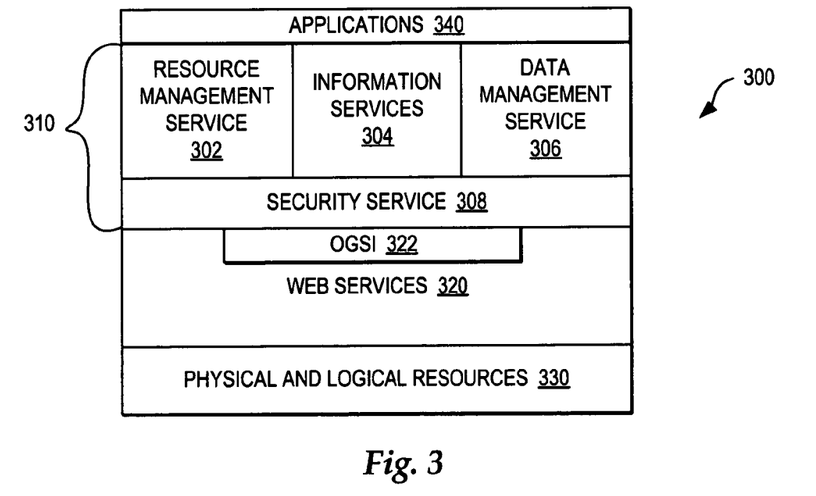
FIG. 3 is a block diagram illustrating one example of an architecture that may be implemented in a grid environment.

Referring now to FIG. 3, a block diagram illustrates one example of an architecture that may be implemented in a grid environment. As depicted, an architecture 300 includes multiple layers of functionality. As will be further described, the present invention is a process which may be implemented in one or more layers of an architecture, such as architecture 300, which is implemented in a grid environment, such as the grid environment described in FIG. 2. It is important to note that architecture 300 is just one example of an architecture that may be implemented in a grid environment and in which the present invention may be implemented. Further, it is important to note that multiple architectures may be implemented within a grid environment.

Within the layers of architecture 300, first, a physical and logical resources layer 330 organizes the resources of the systems in the grid. Physical resources include, but are not limited to, servers, storage media, and networks. The logical resources virtualize and aggregate the physical layer into usable resources such as operating systems, processing power, memory, I/O processing, file systems, database managers, directories, memory managers, and other resources.

Next, a web services layer 320 provides an interface between grid services 310 and physical and logical resources 330. Web services layer 320 implements service interfaces including, but not limited to, Web Services Description Language (WSDL), Simple Object Access Protocol (SOAP), and eXtensible mark-up language (XML) executing atop an Internet Protocol (IP) or other network transport layer. Further, the Open Grid Services Infrastructure (OSGI) standard 322 builds on top of current web services 320 by extending web services 320 to provide capabilities for dynamic and manageable Web services required to model the resources of the grid. In particular, by implementing OGSI standard 322 with web services 320, grid services 310 designed using OGSA are interoperable. In alternate embodiments, other infrastructures or additional infrastructures may be implemented a top web services layer 320.

Grid services layer 310 includes multiple services, the combination of which may implement grid management system 240. For example, grid services layer 310 may include grid services designed using OGSA, such that a uniform standard is implemented in creating grid services. Alternatively, grid services may be designed under multiple architectures. Grid services can be grouped into four main functions. It will be understood, however, that other functions may be performed by grid services.

First, a resource management service 302 manages the use of the physical and logical resources. Resources may include, but are not limited to, processing resources, memory resources, and storage resources. Management of these resources includes scheduling jobs, distributing jobs, and managing the retrieval of the results for jobs. Resource management service 302 monitors resource loads and distributes jobs to less busy parts of the grid to balance resource loads and absorb unexpected peaks of activity. In particular, a user may specify preferred performance levels so that resource management service 302 distributes jobs to maintain the preferred performance levels within the grid.

Second, information services 304 manages the information transfer and communication between computing systems within the grid. Since multiple communication protocols may be implemented, information services 304 manages communications across multiple networks utilizing multiple types of communication protocols.

Third, a data management service 306 manages data transfer and storage within the grid. In particular, data management service 306 may move data to nodes within the grid where a job requiring the data will execute. A particular type of transfer protocol, such as Grid File Transfer Protocol (GridFTP), may be implemented.

Finally, a security service 308 applies a security protocol for security at the connection layers of each of the systems operating within the grid. Security service 308 may implement security protocols, such as Open Secure Socket Layers (SSL), to provide secure transmissions. Further, security service 308 may provide a single sign-on mechanism, so that once a user is authenticated, a proxy certificate is created and used when performing actions within the grid for the user.

Multiple services may work together to provide several key functions of a grid computing system. In a first example, computational tasks are distributed within a grid. Data management service 306 may divide up a computation task into separate grid services requests of packets of data that are then distributed by and managed by resource management service 302. The results are collected and consolidated by data management system 306. In a second example, the storage resources across multiple computing systems in the grid are viewed as a single virtual data storage system managed by data management service 306 and monitored by resource management service 302.

An applications layer 340 includes applications that use one or more of the grid services available in grid services layer 310. Advantageously, applications interface with the physical and logical resources 330 via grid services layer 310 and web services 320, such that multiple heterogeneous systems can interact and interoperate.

Figure 4:
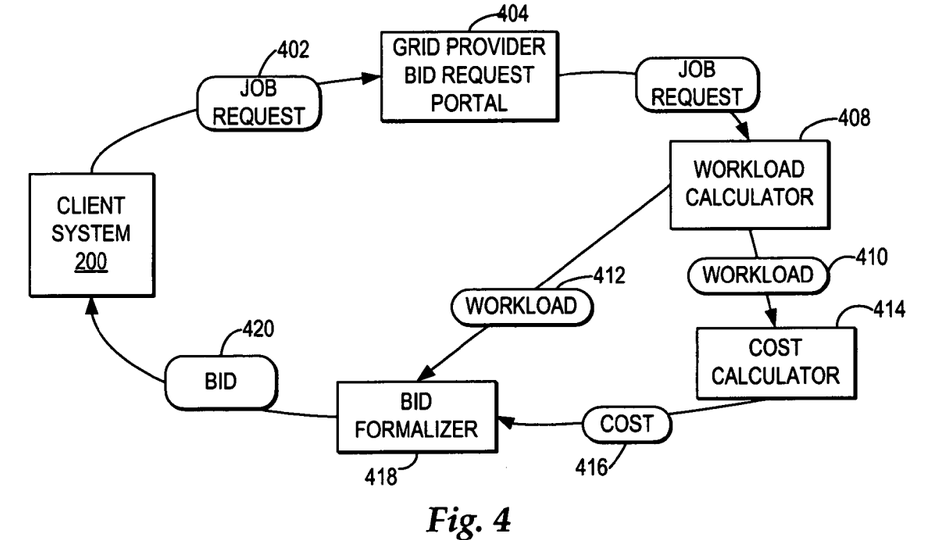
FIG. 4 is a flow diagram depicting a job request submitted by a client system to a grid provider and the resulting bid for that job request returned by the grid provider.

With reference now to FIG. 4, there is depicted a flow diagram of a job request submitted by a client system to a grid provider and the resulting bid for that job request returned by the grid provider. As illustrated, client system 200 submits a job request 402 to a grid provider. In particular, each grid provider may implement a grid management system for managing the bidding process on job requests and for managing the resulting flow of the job through a selection of grid resources managed by the grid provider through the grid management system.

In the example, the grid management system for a grid provider includes a grid provider bid request portal 404 at which job requests are received and queued. Grid provider bid request portal directs each job request to a workload calculator 408 which calculates the workload requirements of job request 402. In particular, workload requirements may include, for example, an estimation of the computational cycles that a job will require and the type of hardware and software platforms required. Workload calculator 408 distributes the workload calculations as workload data 412 to a bid formalizer 418 and as workload data 410 to a cost calculator 414. Cost calculator 414 uses the workload calculation, job request requirements, and current and estimated costs for use of resources to estimate a cost for processing the grid job specified in job request 402. Cost calculator 414 returns cost data 416 to bid formalizer 418. Bid formalizer 418 gathers workload data 412 and cost data 416 into a bid 420 which is returned from the grid provider to client system 200. Bid 420 may agree to perform the grid job exactly as requested or may include exceptions, exclusions, and other variations from the specification in job request 402. In addition, bid 420 may be viewed as a service level agreement, specifying a performance standard which the grid provider agrees to if the grid job is later submitted to the grid provider. Further, bid formalizer 418 may create a bid based on a pricing contract agreement reached between the grid client and the provider before or after the bid placement.

Figure 5:
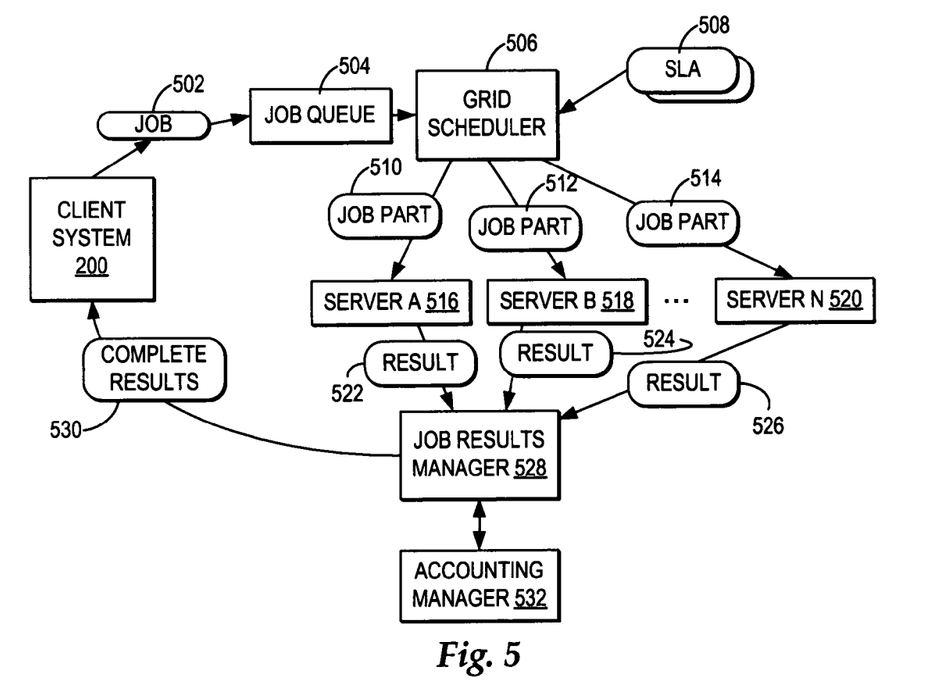
FIG. 5 is a flow diagram illustrating a job submitting by a client system to a grid provider and the results of the job returned by the grid provider.

Referring now to FIG. 5, there is depicted a flow diagram of a job submitting by a client system to a grid provider and the results of the job returned by the grid provider. As illustrated, client system 200 submits job 502 to a grid provider. In particular, as described with reference to FIG. 4, each grid provider may implement a grid management system for managing the flow of a grid job by selecting grid resources for a job to meet a performance requirements, monitoring the progress of jobs and adjusting grid resources if needed to meet performance requirements, and managing the return of results to the client system.

In the example, the grid management system for a grid provider includes a job queue 504 that receives job 502 and holds job 502 until grid scheduler 506 can schedule and dispatch job 502 to grid resources. In particular, grid scheduler 502 accesses service level agreement (SLA) 508, which includes the performance requirements for job 502, based on a bid placed by the grid provider for the specific job or an agreement for job performance requirements for jobs received from a particular client system, for example. Grid scheduler 506 accesses the grid resources required to handle job 502, for example server A 516, server B 518, and server N 520. Although not depicted, grid scheduler 506 may access a grid manager and other components of the grid management system that build the required resources for a grid job, access resources from other grid environments, and sell-off grid jobs if necessary to other grid providers.

In the example, grid scheduler 506 divides job 502 into job parts 510, 512, and 514 that are distributed to server A 516, server B 518, and server N 520, respectively. A job results manager 528 collects results 522, 524, and 526 from server A 516, server B 518, and server N 520, respectively. Job results manager 528 returns complete results 530 to client system 200. In addition, job results manager 528 updates an accounting manager 532 when the job is complete. Accounting manager 532 communicates with a workload manager (not depicted) that monitors the use of server A 516, server B 518, and server N 520 by job 502 to calculate the total workload of job 502 and the total cost of job 502. In particular SLA 508 may specify factors that control the total cost of job 502, such as a maximum cost, a fixed cost, a sliding cost scale if performance requirements are not met, and other pricing adjustment factors.

Figure 6:
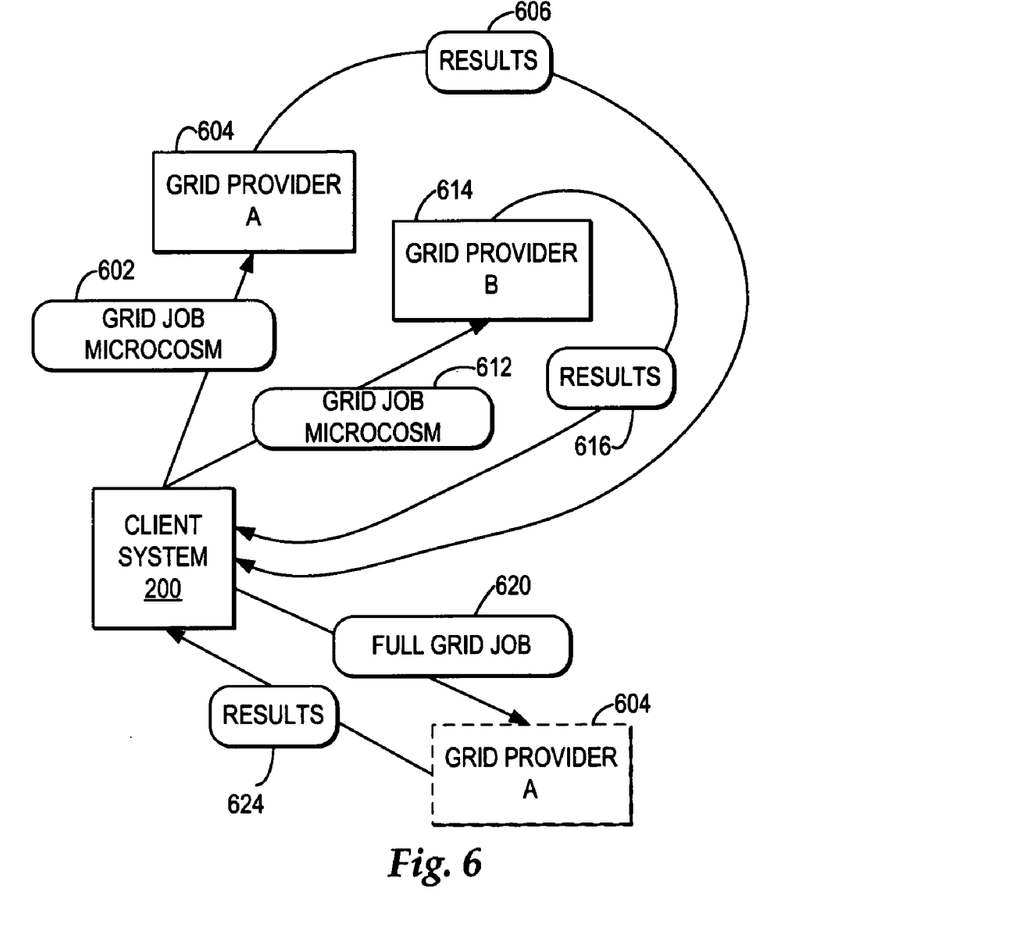
FIG. 6 is a flow diagram depicting a process for submitting a microcosm of a grid job to multiple grid providers to calculate a relative cost per client-defined application metric.

With reference now to FIG. 6, there is depicted a flow diagram of a process for submitting a grid job microcosms to multiple grid providers to calculate a relative cost per client-defined application metric. In the example, a client system 200 apportions a grid job into microcosms, which are small, representative jobs of the larger grid job that needs to be submitted to a grid provider. In the example, client system 200 submits grid job microcosm 602 and grid job microcosm 612 to grid providers 604 and 614, respectively. In one embodiment, client system 200 has already submitted a job request for the grid job microcosm to grid providers 604 and 614, as described with reference to FIG. 4, however, in an alternate embodiment, client system 200 may submit the grid job microcosms to grid providers 604 and 614 with pricing and performance expectations based on published rates or verbally agreed to rates, for example.

Each of grid providers 604 and 614 process gird job microcosms 602 and 612 and return results 606 and 616 the same manner as described with reference to a grid provider processing a grid job in FIG. 5. Client system 200, as will be further described with reference to FIGS. 7, 8, and 9, retrieves the results and costs for each of grid job microcosms 602 and 604 and calculates a translation value for each grid provider based on a client-defined application metric to grid provider metric ratio. Then, client system 200 calculates an estimated cost for the full grid job according to the number of client-defined application metric operations required for the full grid job adjusted by the translation value, compares the costs estimated for each grid provider, and selects the most cost effective provider.

According to an advantage, by sampling the actual performance and cost for each provider and translating the cost into a client-defined application metric basis, client system 200 can compare the actual cost for performance, rather than the promised cost for performance, on client-defined application metric basis, before sending a large grid job or multiple large grid jobs. In the example, after sampling the results and cost for each of grid job microcosms 602 and 612, client system 200 selects to send full grid job 620, of which grid job microcosm 602 and 612 are representative sets, to grid provider 604. Grid provider 604 processes full grid job 620, as described with reference to FIG. 5, and returns result 624 to client system 200.

Figure 7:
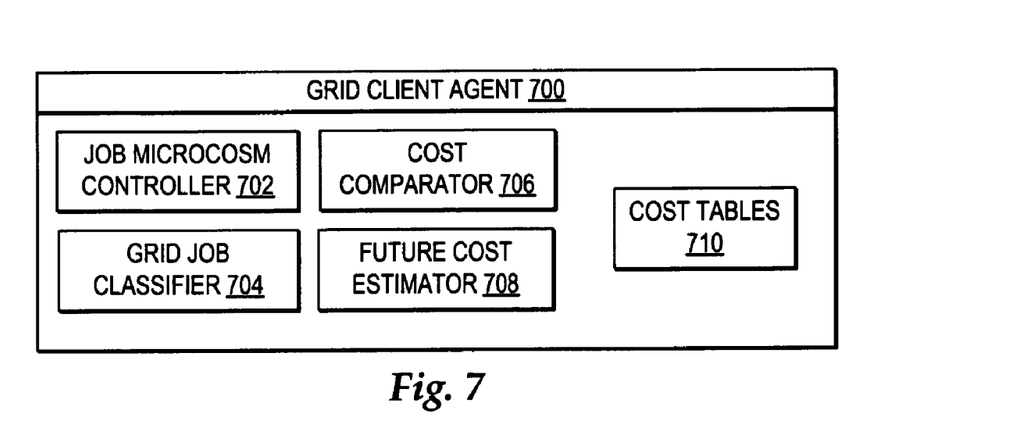
FIG. 7 is a block diagram depicting a grid client agent for estimating future grid job costs by comparing a current grid job of a particular classification with a history of stored costs for other grid jobs of that particular classification.

Referring now to FIG. 7, a block diagram depicts a grid client agent for estimating future grid job costs by comparing a current grid job of a particular classification with a history of stored costs for other grid jobs of that particular classification. In the example, grid client agent 700 describes software modules operating within client system 200 or another system that enables client system 200.

A job microcosm controller 702 controls the process, as described with reference to FIG. 6, for submitting job microcosms of a particular grid job to multiple grid providers.

In particular, job microcosm controller 702 may first query multiple grid providers with a job request for the job microcosm. In addition to querying grid providers with job requests as described with reference to FIG. 6, additional rate information may be acquired verbally, in writing, via email or through some other electronic interchange method. Job microcosm controller 702 may store the bids or rate quotes, designating a price per computational cycle. In one example, a first provider returns a price per hour, a second provider returns a price per floating point operation and a third provider returns a price based on the complex formula of the provider's grid environment.

Next, once job microcosm controller 702 acquires bids and rate quotes from multiple grid providers, job microcosm controller 702 submits job microcosms, which are small jobs representative of larger grid jobs to be submitted, to a selection of the multiple grid providers. In one example, if a corporation needs an average of 20,000,000 records merged each night, then the job microcosm distributed to each of the selected grid providers may include 1% of these records. In another example, a client does not send a portion of the actual grid job, but instead submits a job microcosm of an analogous job with tester data.

When job microcosm controller 702 receives the computational results of the job microcosms are received, the charges from each grid provider for each job microcosm are already received. Job microcosm controller 702 also detects the time taken, once the job microcosm was submitted to a grid provider, for the grid provider to return a result. In the example, the first provider takes five minutes to return a result and charges $2.20, the second provider takes one minute to return a result and charges $1.74 and the third provider takes two minutes to return a result and charges $3.40. In particular, it will be understood that job microcosm controller 702 may receive the charges from each grid provider through multiple communication media, including a separate transmission from the grid provider to client system 200, an email communication, an embedded accounting token digitally signed and returned to client system 200 with a transaction receipt.

Once all the costs per grid microcosm are received, a cost comparator 706 compares the actual costs by grid provider for performing a particular category of grid job. In particular, cost comparator 706 calculates a cost by client-defined application metric for each grid job microcosm. In particular, each grid provider submits provider-defined metric costs, such as cost per hour or cost per provider-based complex formula. The client, however, defines grid jobs at an application level granularity. For example, a client defined application metric is a cost per record merge. Once cost comparator 706 calculates a client-defined application metric to grid-provider metric ratio, then cost comparator 706 can translate the number of client-defined application metric operations required for a full job into a price using the client-defined application metric to grid-metric ratio as a translation value. Cost comparator 706 determines the most cost effective grid provider and triggers submission of the remainder of the grid job or the actual grid job to the most cost effective grid provider.

In addition cost comparator 706 calculates the client-defined application metric to grid-provide metric cost ratio for cost tables 710 and stores the cost by client-defined application metric in cost tables 710. As illustrated with reference to FIG. 8, in particular, cost tables 710 includes a column for a client-defined application metric 804. Each client-defined application metric, although not depicted, is associated with a client-defined category. Client-defined categories are families of grid jobs classified at an application level for performing similar types of operations. Grid job classifier 704 may define categories or categories may be entered and particular grid jobs classified. In the example carried through in FIG. 8, the client-defined categories are "batch merges" with a client-defined application metric of "per merge" and "meteorological operations" with a client-defined application metric of "per model iteration". These client-defined categories may apply, for example, where the client is a university that performs only two computational functions. First, the university system performs payroll functions, which requires database batch merges. Second, the university system performs computationally-intensive research work which requires greater floating point operations. It will be understood that additional categories may be added to classify other types of operations typically performed by a client in need of the computational power and other resources provided by on-demand grid providers.

Figure 8:
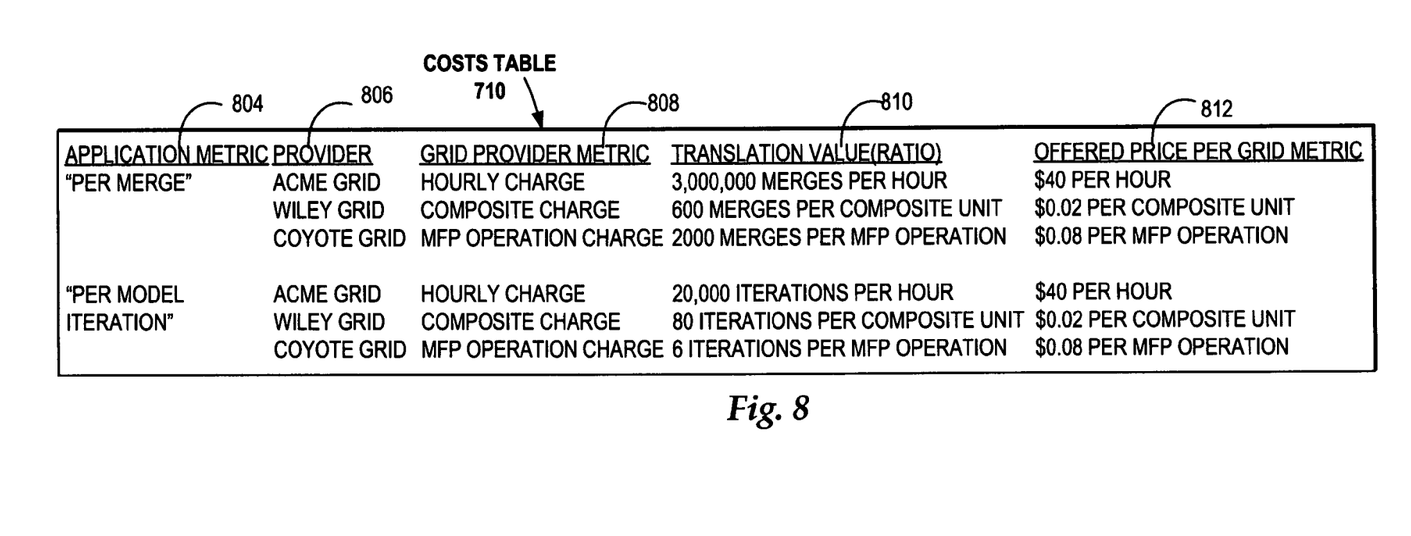
FIG. 8 is a table illustrating examples of client-defined application metric based costs compared with grid provider metric based costs for categories of grid jobs.

Cost tables 710 includes a second column for a provider identifier 806. In the example, values listed under provider identifiers 806 are "acme grid", "wiley grid", and "coyote grid". It will be understood that other types of provider identifiers may be implemented, including an address and other indicia of a grid provider.

Cost tables 710 includes a third column for a grid-provider metric 808. In the example, the values listed under grid-provider metric 808 are "hourly charge", "proprietary composite charge", and "million floating point (MFP) operations charge". It will be understood that additional types of grid-provider metric values may be defined by grid providers. Further, it will be understood that grid providers may designate a grid-provider metric when bidding on a job request or with the charges returned for processing a grid microcosm. In addition, a "proprietary composite charge" refers to a charge calculated by the grid provider based on multiple factors, including for example, the data volume moved across the network, jobs submitted to the processor run queues, and bytes written to and read from a grid provider's own storage system.

A fourth column in cost tables 710 includes a translation value 810 which represents the ratio of the client-defined application metric to the grid-provider metric. In the example, values listed under translation value 810 include "3,000,000 merges per hour", "600 merges per composite unit", and "2000 merges per MFP operations". In particular, the translation values are calculated by cost comparator 706 and represent the number of client-defined application metrics accomplished per grid-provider metric ratio. As previously described, translation values may be calculated based on grid microcosm. In other embodiments, however, translation values may also be calculated and updated based on a full job submission.

Finally, the fith column in cost tables 710 includes an offered pricing per grid-provider metric 812. In the example, the values listed under offered pricing per grid-provider metric 812 include "$40 per hour", "$0.02 per composite unit", and "$0.08 per MFP". In an alternate embodiment, historical pricing ranges may be given by provider, as well as the most recent price by provider.

According to an advantage of the invention, when a client wants to estimate a cost of a new grid job, grid job classifier 704 classifies the grid job and future cost estimator 708 searches cost tables 710 for client-defined application metric based costs for that category of grid job. Then, based on the client-defined application metric requirements of the new grid job, future cost estimator 708 estimates the cost for the new grid job according to grid provider. In one example, based on the values illustrated in cost tables 710, a new grid job requiring 3,000,000 batch merges would cost $40 on "acme grid" (3,000,000 merges per hour/$40 per hour), $100 on "wiley grid" (600 merges per composite unit/$0.02 per composite unit), and $120 on "coyote grid" (2000 merges per MFP operations/$0.08 per MFP).

Further, according to the advantage, if future cost estimator 708 searches cost tables 710 for client-defined application metric based costs for that category of grid job and none or available or the costs are out of date, then future cost estimator 708 initiates job microcosm controller 702 to determine current costs for microcosms of the particular classification category of grid job.

In addition, it is important to note that as pricing per grid-provider metric changes over time or in response to market conditions, the new cost can be inserted into the offered pricing per grid-provider metric 812 column in cost tables 710 and prices estimates for jobs classified within the categories updated, without changing the translation values. For example, if the "acme grid" price increases to $55 per hour, the "wiley grid" price drops to $0.013 per composite unit, and the "coyote grid" price drops to "$0.05 per MFP", the client-defined application metric to grid-provider metric ratio listed under the translation value 810 column does not change, so future cost estimator 708 can still estimate the future cost to complete a 5,000,000 batch merge job tomorrow based on the updated prices, e.g. $91.67 on "acme grid" (3,000,000 merges per hour/$55 per hour), $108.33 on "wiley grid" (600 merger per composite unit/$0.013 per composite unit) and $125 on the "coyote grid" (2000 mergers per MFP operation/$0.05 per MFP).

Figure 9:
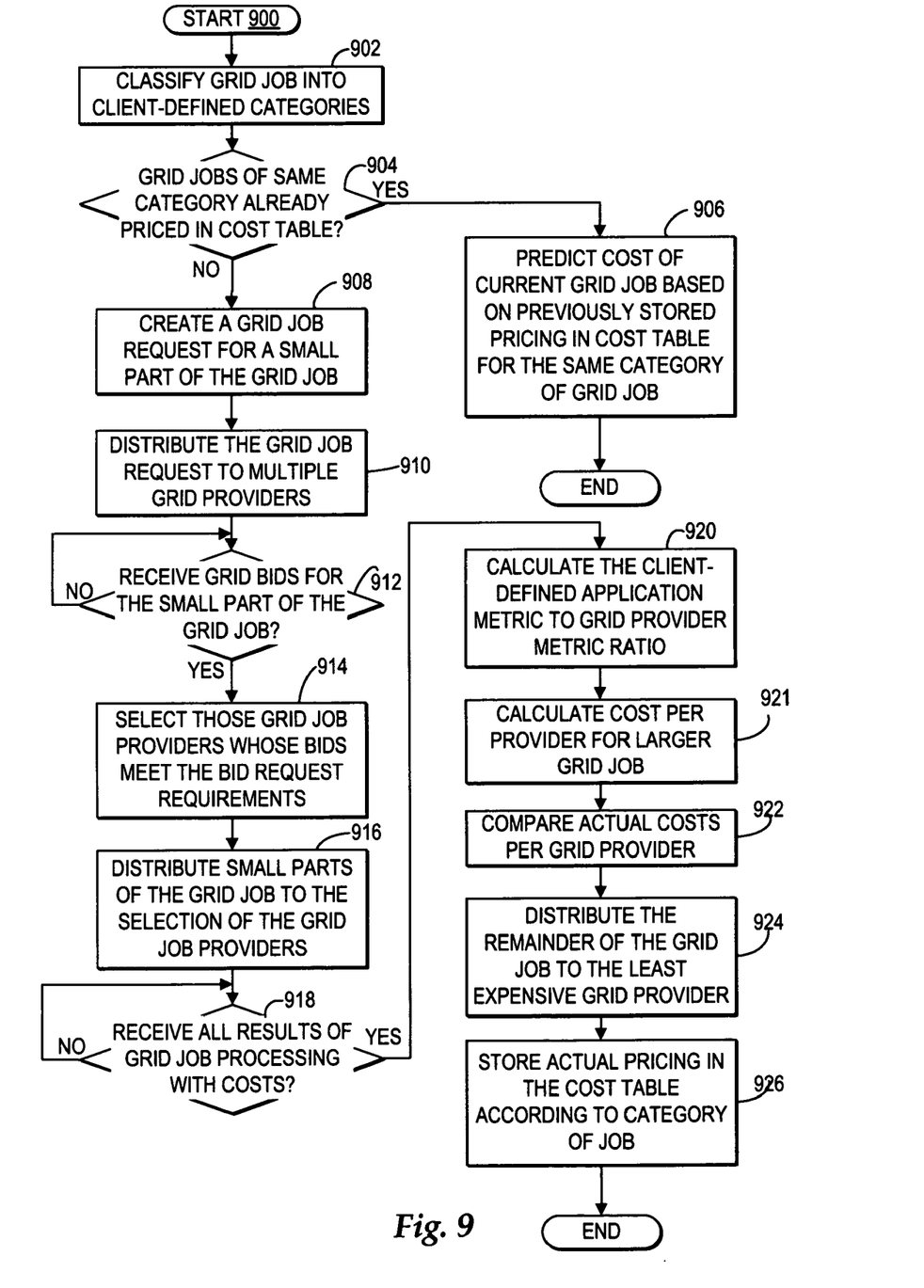
FIG. 9 is a high level logic flowchart depicting a process and program for a grid client agent to estimate future costs of grid jobs of a client-defined classification in accordance with the method, system, and program of the present invention.

Referring now to FIG. 9, there is depicted a high level logic flowchart of a process and program for a grid client agent to estimate future costs of grid jobs of a client-defined classification in accordance with the method, system, and program of the present invention. As illustrated, the process starts at block 900 and thereafter proceeds to block 902. Block 902 depicts a determination of classifying a grid job according to nature into a client-defined category. Next, block 904 illustrates a determination whether grid jobs of the same category are already priced in the cost table. If grid jobs of the same category are already priced in the cost table, then the process passes to block 906. Block 906 depicts predicting the cost of the current grid job based on the previously stored pricing in the cost table for the particular category of grid job, and the process ends. In particular, the cost table is cost table 710, which includes the translation value. Thus, predicting the cost of a current grid job requires determining the number of client-defined application metric operations required and converting the number of client-defined application metric operations to a grid-provider metric based cost through the translation value of the category of grid job.

Returning to block 904, if there are not already grid jobs of the same category priced in the cost table, then the process passes to block 908. In addition, although not depicted, at block 904 a determination may also be made that even though there grid jobs of the same category already priced in the cost table, that the pricing is outdated, and the process passes to block 908.

Block 908 depicts creating a grid job request for a small part of the grid job. Next, block 910 illustrates distributing the grid job request to multiple grid providers. Thereafter, block 912 depicts a determination whether the grid client agent receives grid bids for the small part of the grid job. As depicted, if no bids are yet received, the process iterates at block 912, however, if no bids are received after a period of time, then the job request may be adjusted and resubmitted to the multiple grid providers. Once bids are received, then the process passes to block 914.

Block 914 depicts selecting those grid job providers whose bids meet the bid request requirements. Next, block 916 illustrates distributing small parts of the grid job to the selection of the grid job providers. Thereafter, block 918 depicts a determination whether the grid client agent receives all the results of the grid job processing with costs. As illustrated, if the results are not yet received, the process iterates at block 918, however, if not all results are received within the expected period of time for response, then those grid providers not returning a results may be queried. Once the results are retrieved, then the process passes to block 920.

Block 920 depicts calculating the client-defined application metric to grid provider metric ratio for each grid provider. Next, block 921 illustrates calculating the cost per grid provider using the ratio based on the number of client-defined application metric operations required for the large grid job. Next, block 922 illustrates comparing the actual costs per grid provider. Thereafter, block 924 depicts distributing the remainder of the grid job to the projected least expensive grid provider based on client-defined application metrics. Then, block 926 illustrates storing the ratio and grid provider costs in the cost table according to the client-defined classification of the grid job, and the process ends.

While the invention has been particularly shown and described with reference to a preferred embodiment, it will be understood by those skilled in the art that various changes in form and detail may be made therein without departing from the spirit and scope of the invention.

What is claimed is:

1. A computer-implemented method for estimating a future cost of a grid job, said method comprising:
   calculating, at a client system enabled to submit a particular grid job to a grid provider that facilitates a grid environment for processing said particular grid job, a ratio of an application based metric to a grid provider metric for processing said particular grid job by:
   distributing a job microcosm of said particular grid job from said client system to said grid provider via a network for processing in said grid environment; and
   responsive to receiving a result of said job microcosm and a charge for processing said job microcosm based on a grid provider metric from said grid provider, calculating at said client system said ratio of said application based metric to said grid provider metric and identifying said cost per grid provider metric from said charge for processing said job microcosm;

creating by said client system, a table with an entry comparing said application based metric to a cost per grid provider metric for said grid provider with said ratio;

storing, by said client system, said table with said entry for said particular grid job; and responsive to said client system detecting a next grid job classified by said at least one application metric, accessing said entry comprising said application based metric to said cost per grid provider metric for said grid provider with said radio;

calculating an estimated cost for said grid provider to process said next grid job based on a particular number of application based metric operations required for said next grid job translated by said ratio into said grid provider metric and multiplied by said cost per grid provider metric.

2. The computer-implemented method according to claim 1 for estimating a future cost of a grid job, further comprising:

distributing a job request specifying requirements for processing said job microcosm to said grid provider; and responsive to receiving a bid for said grid provider to process said job microcosm according to requirements, distributing said job microcosm to said grid provider for processing.

3. The computer-implemented method according to claim 1 for estimating a future cost of a grid job, wherein creating a table with an entry comparing said application based metric to a cost per grid provider metric for said grid provider with said ratio, further comprises:

accessing said cost per grid provider metric from at least one from among charges received from said grid provider for processing said particular grid job and a published rate per grid provider metric.

4. The computer-implemented method according to claim 1 for estimating a future cost of a grid job, further comprising:

responsive to detecting, at said client system, an adjusted cost per grid provider metric for said grid provider, updating said cost per grid provider metric in said table; and automatically reestimating said cost for said grid provider to process said next grid job based on said particular number of application based metric operations required for said next job translated by said ratio into said grid provider metric and multiplied by said adjusted cost per grid provider metric.

5. The computer-implemented method according to claim 1 for estimating a future cost of a grid job, wherein calculating, at a client system enabled to submit a particular grid job to a grid provider that facilitates a grid environment for processing said particular grid job, a ratio of an application based metric to a grid provider metric for processing said particular grid job, further comprises:

submitting a plurality of job microcosms of said particular grid job to a plurality of grid providers; and responsive to receiving a plurality of results and a plurality of charges for processing said plurality of grid microcosms from each of said plurality of grid providers, calculating a plurality of ratios of said application based metric to each of said plurality of grid providers metrics for processing said particular grid job;

wherein creating a table with an entry comparing said application based metric to a cost per grid provider metric for said grid provider with said ratio, further comprises creating said table with a plurality of entries, where each entry compares said application based metric to a cost for one of said plurality of grid providers per each of said plurality of grid provider metrics a particular ration for said one of said plurality of grid providers;

wherein storing said table with said entry for said particular grid job, further comprises storing each of said plurality of entries in said table; and wherein estimating a cost for said grid provider to process said next grid job based on a particular number of application based metric operations required for said next grid job translated by said ratio into said grid provider metric and multiplied by said cost per grid provider metric, further comprises:

estimating a plurality of costs based on said application based metric for each of said plurality of grid providers to process said next job; and comparing said plurality of costs to identify a least expensive grid provider from among said plurality of grid providers.

6. The computer-implemented method according to claim 1 for estimating a future cost of a grid job, further comprising:

classifying said particular grid job into a particular category from among a plurality of categories of grid jobs, wherein said particular category comprises grid jobs with operations measurable by said application based metric;

storing said entry for said particular grid job according to said particular category;

responsive to detecting a next grid job, classifying said next grid job according to said particular category of grid job;

searching said table for said entry associated with said same particular category; and estimating a cost for said grid provider to process said next grid job in said same particular category as said particular grid job based on said entry calculated based on said particular grid job.

* * * * *